(12) United States Patent
Mackenzie et al.

(10) Patent No.: US 12,260,546 B2
(45) Date of Patent: Mar. 25, 2025

(54) CONCATENATION OF MACHINE VISION INSPECTION RESULTS

(71) Applicant: VAIA Technologies LLC, Westborough, MA (US)

(72) Inventors: Adam Mackenzie, Fitchburg, MA (US); Neil Lobo, Westborough, MA (US); Charles A Gouin, Providence, RI (US)

( * ) Notice: Subject to any disclaimer, the term of this patent is extended or adjusted under 35 U.S.C. 154(b) by 34 days.

(21) Appl. No.: 18/189,196

(22) Filed: Mar. 23, 2023

(65) Prior Publication Data

US 2023/0306587 A1    Sep. 28, 2023

Related U.S. Application Data

(60) Provisional application No. 63/322,643, filed on Mar. 23, 2022.

(51) Int. Cl.
| | |
|---|---|
| *G06T 7/00* | (2017.01) |
| *G06V 30/19* | (2022.01) |
| *H04N 23/90* | (2023.01) |
| *G06K 7/14* | (2006.01) |

(52) U.S. Cl.
CPC ........ *G06T 7/001* (2013.01); *G06V 30/19007* (2022.01); *H04N 23/90* (2023.01); *G06K 7/1413* (2013.01)

(58) Field of Classification Search
CPC ... G06T 7/001; G06V 30/19007; H04N 23/90
See application file for complete search history.

(56) References Cited

U.S. PATENT DOCUMENTS

| | | |
|---|---|---|
| 4,493,420 A | 1/1985 | Dennis |
| 5,228,462 A | 7/1993 | Osmalov et al. |
| 10,703,521 B2 | 7/2020 | Almogy et al. |
| 2009/0179072 A1* | 7/2009 | Szesko ............... G16H 20/13 235/375 |
| 2017/0004384 A1 | 1/2017 | Audo et al. |
| 2017/0014868 A1 | 1/2017 | Garcia et al. |
| 2017/0024869 A1* | 1/2017 | Konishi ............ G06V 10/751 |
| 2018/0237179 A1* | 8/2018 | Franzaroli ........... G01N 21/90 |

* cited by examiner

*Primary Examiner* — Mishawn N. Hunter
(74) *Attorney, Agent, or Firm* — Outside General Counsel, LLP; Alexander Franco

(57) ABSTRACT

A vision-based product inspection system captures multiple images of each of multiple individual instances of a product as each instance passes through various phases of a production process. The system includes multiple cameras with each camera situated at a known location along a moving conveyor, conveyor belt, production line, or assembly line that moves instances of the product through various phases of the production process. Each camera can be associated with a known location along the conveyor and each image can be associated with a value representing the position of the conveyor as it moves product. Based on each camera's location and the values representing the conveyor's position, a sequence of images can be accumulated representing the progression of any single instance of a product as it moves through the production process. Automated quality control inspection can be performed by comparing or analyzing images in the sequence.

20 Claims, 2 Drawing Sheets

CONCATENATION OF MACHINE VISION INSPECTION RESULTS

RELATED APPLICATIONS

The subject matter of this application is related to U.S. Provisional Application No. 63/322,643, filed on 2022 Mar. 23, which is hereby incorporated by reference in its entirety.

SUMMARY OF THE INVENTION

A vision-based product inspection system captures multiple images of each of multiple individual instances of a product as each instance passes through various phases of a production process. The system includes multiple cameras with each camera situated at a known location along a moving conveyor, conveyor belt, production line, or assembly line that moves instances of the product through various phases of the production process. Each camera can be associated with a known location along the conveyor and each image can be associated with a value representing the position of the conveyor as it moves product. Based on each camera's location and the values representing the conveyor's position, a sequence of images can be accumulated representing the progression of any single instance of a product as it moves through the production process. Automated quality control inspection can be performed by comparing or analyzing images in the sequence.

A system for performing inspections of product instances during a production process can include: a product conveyor provided or configured to move the product instances through the production process; a plurality of cameras provided or positioned at different locations along the product conveyor, wherein each camera of the plurality of cameras has an associated field of view; and control logic configured to perform a method comprising: for each camera of the plurality of cameras, capturing images of product instances as the product instances pass through the camera's field of view on the conveyor; associating each of a plurality of images captured by different ones of the cameras as being images of a same product instance; and based on one or more of the plurality of images of the same product instance, making a determination to reject the same product instance.

The method can further include: determining that the same product instance has reached a rejection location along the product conveyor; and taking action to reject the same product instance at the rejection location. The method can further include: for each camera of the plurality of cameras, determining a difference in location along an axis parallel to a direction of travel of the product conveyor of a field of view of the each camera relative to a field of view of view of another of the plurality of cameras. The method can further include: monitoring a travel position of the product conveyor over time; and for each of the plurality of images, determining a travel position of the conveyor at a time of capture.

The associating each of a plurality of images captured by different ones of the cameras as being images of a same product instance can be based on, for each image of the plurality of images: the difference in location along an axis parallel to a direction of travel of the product conveyor of a field of view of the each camera capturing the each image relative to a field of view of view of another of the plurality of cameras, and the travel position of the conveyor at a time of capture.

Travel position can be indicated using an incremental encoder. The method can further include: in response to determining that the incremental encoder has experienced a rollover, temporarily adjusting travel positions for affected images captured after the rollover. The product conveyor can have a circulating product carriage means marked with scannable indicia of travel position. The product carriage means can be a belt and the scannable indicia can be machine-readable codes. The machine-readable codes can be barcodes. The scannable indicia can be printed numbers. The images of product instances captured as the product instances pass through the camera's field of view on the conveyor can include the scannable indicia, and the associating each of a plurality of images captured by different ones of the cameras as being images of a same product instance can be based on matching of the scannable indicia.

As will be appreciated by one skilled in the art, multiple aspects described in this summary can be variously combined in different operable embodiments. All such operable combinations, though they may not be explicitly set forth in the interest of efficiency, are specifically contemplated by this disclosure.

DETAILED DESCRIPTION

Figure 1:
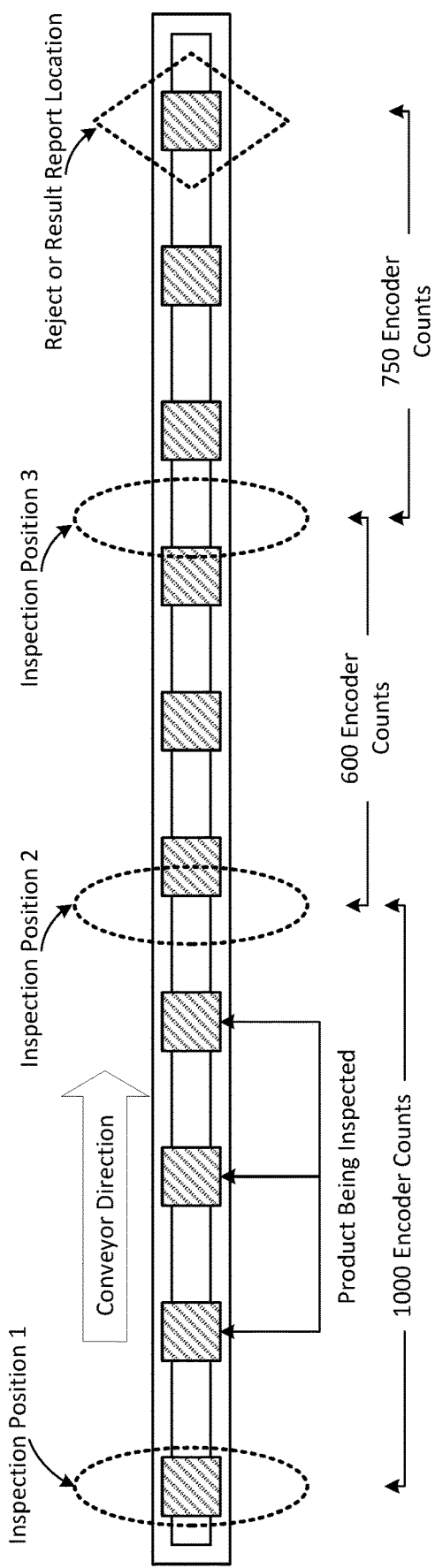
FIG. 1 illustrates an example conveyor schematic.

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted. By way of example, this disclosure may set out a set or list of a number of options or possibilities for an embodiment, and in such case, this disclosure specifically contemplates all clearly feasible combinations and/or permutations of items in the set or list.

A vision-based product inspection system captures multiple images of each of multiple individual instances of a product as each instance passes through various phases of a production process. The system includes multiple cameras with each camera situated at a known location along a moving conveyor, conveyor belt, production line, or assembly line (any and all of which may be referred to herein by the term "conveyor") that moves instances of the product (which instances are also referred to herein as a "part" in the singular) through various phases of the production process. Each camera can be associated with a known location along the conveyor and each image can be associated with a value (e.g. counter, timer, or state) representing the position of the conveyor as it moves product. Based on each camera's location and the values representing the conveyor's position, a sequence of images can be accumulated representing the progression of any single instance of a product as it moves through the production process. Automated quality control inspection can be performed by comparing or analyzing images in the sequence.

The system and method can be configured to automatically inspect products on the conveyor when multiple inspections must take place in series during an assembly process. By way of example, a product can be first inspected in one location as it moves on a continuously moving conveyor, work is done to the product, it is inspected again, more work is done to the product, it is inspected at a third location, and then the product moves to a final location where it can be rejected if one or more inspection criteria fail. The system can be configured to keep track of products on the conveyor to avoid confusing images and/or inspection results of different product instances/parts with each other.

The system can use multiple cameras which capture images at different points in the production process. Based on multiple captured images, the system can derive one or more inspection results, conclusions or determinations. The system can be configured to support comparison of two or more images that are determined to be of the same instance of a product regardless of stopping or restarting of a conveyor, or of a product having been removed from the line between inspection locations.

In one embodiment, a standard incremental encoder can be fitted to a conveyor or an encoder signal can be received from an assembly line that indicates the travel position of a conveyor surface. The encoder does not need to give absolute position of the conveyor travel but can provide an electrical pulse signal that can be converted into distance travelled by the surface of a conveyor belt or an assembly line.

For instance, an encoder might output 10 pulses for every inch of conveyor belt travel. The encoder might count from 0 to a very high number (XXX) before returning to zero and counting back up, where each image taken is associated with an encoder count. The encoder can employ logic to handle a rollover condition where the encoder count number returns to zero after an image is captured earlier but before one or more subsequent images are captured later in the production process. This results in one or more subsequent images having a lower encoder value than previous ones. In these cases, the rollover value can be added to the subsequent image encoder values so that those images are the expected count distance away from previous images in encoder counts.

In one embodiment, an Allen Bradley programmable logic controller (PLC) is configured to receive the encoder counts. Other embodiments can be agnostic to the brand and form of a high-speed input device used to capture an encoder signal. An encoder signal received from an existing production line can be used in a retrofit inspection application.

FIG. 1 illustrates an example in which the distance from an Inspection Location 1 to Inspection Location 2 is 1000 counts and from Inspection Location 2 to Inspection Location 3 is 600 counts, and so on. Pulses per inch (or other distance measure) can be determined, and the distances between the inspection points can be measured and converted into encoder counts. Each inspection location can be implemented by a camera, and the ovals in FIG. 1 represent fields of view of the cameras.

When the system captures an image from Inspection Location 1, it can check the encoder value at the time (X) and record it, attaching this number to the image. The image can be held in memory while the system waits for an image to come in from Inspection Location 2 with the expected difference in encoder counts. The encoder number for the Location 2 image need not be an exact match to the expected distance but may instead be a range or window. The range or window of less than 1 product pitch allows for small variations in cycle time and motion discrepancies. For instance, if the product is 100 encoder counts long in the illustrated example, the image from Inspection Location 2 can be expected to have an encoder value between X+950 and X+1050.

Once the Inspection Location 1 image is matched to an Inspection Location 2 image, the vision system can perform a comparison between the images. By way of example, the system can compare the images to make an automated determination of how much material was added between Inspection Locations 1 and 2.

If no match is made to a product after more than enough encoder counts have elapsed, then an image from one or more prior inspection locations can be discarded or considered a failure since the product can be assumed to have been removed from the conveyor before it could travel past a next inspection location.

The process can be repeated for more than two locations as needed. The same encoder travel and window can be applied to track the product to a location where it is rejected or where the results can then be reported for a specific product instance.

In one embodiment, a conveyor belt or line can be marked with scannable indicia of its position and scanners can be used to determine the position of the conveyor over time. In one embodiment, the scannable indicia can be increasing numbers or sequence data encoded into printed and/or machine-readable codes, such as barcodes, printed numbers, or magnetically encoded strips. In one embodiment, the machine-readable codes can be visually scanned by the same cameras as used to capture images of product instances. In this manner, both a product instance and its relative location on the conveyor belt can be determined from a same image, and multiple images can then be associated as being of the same product.

Computer Implementation

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include one or more standalone, client and/or server computers, which can be optionally networked through wired and/or wireless networks as a networked computer system.

The special purpose software can include one or more instances thereof, each of which can include, for example, one or more of client software, server software, desktop application software, app software, database software, operating system software, and driver software. Client software can be configured to operate a system as a client that sends requests for and receives information from one or more servers and/or databases. Server software can be configured to operate a system as one or more servers that receive requests for and send information to one or more clients. Desktop application software and/or app software can operate a desktop application or app on desktop and/or portable computers. Database software can be configured to operate one or more databases on a system to store data and/or information and respond to requests by client software to retrieve, store, and/or update data. Operating system software and driver software can be configured to provide an operating system as a platform and/or drivers as interfaces to hardware or processes for use by other software of a computer or computer system. By way of example, any data created, used or operated upon by the embodiments disclosed herein can be stored in, accessed from, and/or modified in a database operating on a computer system.

Figure 2:
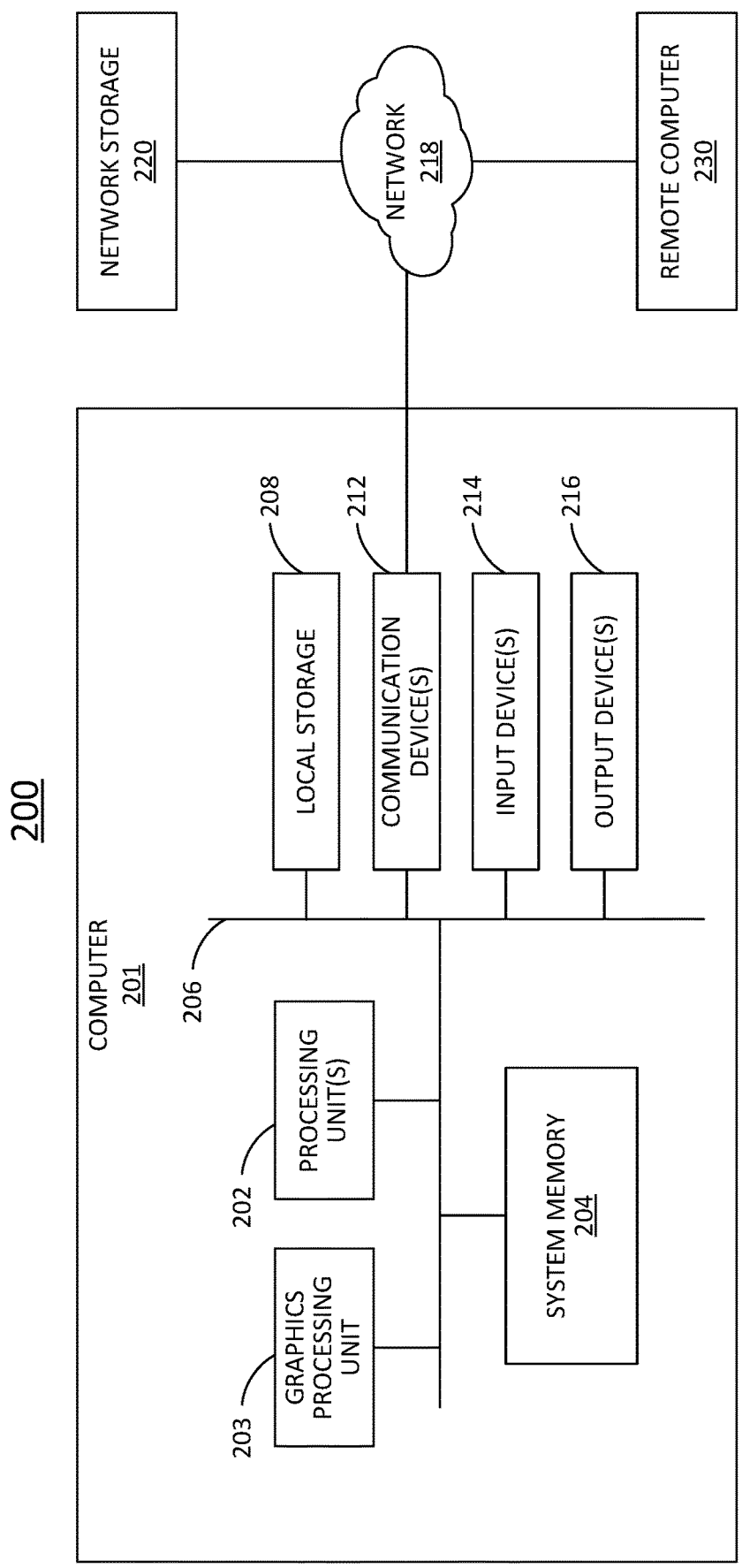
FIG. 2 illustrates a general computer architecture.

FIG. 2 illustrates a general computer architecture 200 that can be appropriately configured to implement components disclosed in accordance with various embodiments. The computing architecture 200 can include various common computing elements, such as a computer 201, a network 218, and one or more remote computers 230. The embodiments disclosed herein, however, are not limited to implementation by the general computing architecture 200.

Referring to FIG. 2, the computer 201 can be any of a variety of general purpose computers such as, for example, a server, a desktop computer, a laptop computer, a tablet computer or a mobile computing device. The computer 201 can include a processing unit 202, a system memory 204 and a system bus 206.

The processing unit 202 can be or include one or more of any of various commercially available computer processors, which can each include one or more processing cores that can operate independently of each other. Additional co-processing units, such as a graphics processing unit 203, also can be present in the computer.

The system memory 204 can include volatile devices, such as dynamic random access memory (DRAM) or other random access memory devices. The system memory 204 can also or alternatively include non-volatile devices, such as a read-only memory or flash memory.

The computer 201 can include local non-volatile secondary storage 208 such as a disk drive, solid state disk, or removable memory card. The local storage 208 can include one or more removable and/or non-removable storage units. The local storage 208 can be used to store an operating system that initiates and manages various applications that execute on the computer. The local storage 208 can also be used to store special purpose software configured to implement the components of the embodiments disclosed herein and that can be executed as one or more applications under the operating system.

The computer 201 can also include communication device(s) 212 through which the computer communicates with other devices, such as one or more remote computers 230, over wired and/or wireless computer networks 218. Communications device(s) 212 can include, for example, a network interface for communicating data over a wired computer network. The communication device(s) 212 can include, for example, one or more radio transmitters for communications over Wi-Fi, Bluetooth, and/or mobile telephone networks.

The computer 201 can also access network storage 220 through the computer network 218. The network storage can include, for example, a network attached storage device located on a local network, or cloud-based storage hosted at one or more remote data centers. The operating system and/or special purpose software can alternatively be stored in the network storage 220.

The computer 201 can have various input device(s) 214 such as a keyboard, mouse, touchscreen, camera, microphone, accelerometer, thermometer, magnetometer, or any other sensor. Output device(s) 216 such as a display, speakers, printer, or eccentric rotating mass vibration motor can also be included.

The various storage 208, communication device(s) 212, output devices 216 and input devices 214 can be integrated within a housing of the computer, or can be connected through various input/output interface devices on the computer, in which case the reference numbers 208, 212, 214 and 216 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

Although the subject matter has been described in terms of certain embodiments, other embodiments that may or may not provide various features and aspects set forth herein shall be understood to be contemplated by this disclosure. The specific embodiments set forth herein are disclosed as examples only, and the scope of the patented subject matter is defined by the claims that follow.

In the claims, the terms "based upon" and "based on" shall include situations in which a factor is taken into account directly and/or indirectly, and possibly in conjunction with other factors, in producing a result or effect. In the claims, a portion shall include greater than none and up to the whole of a thing.

The invention claimed is:

1. A method for performing inspections of product instances during a production process, the method comprising:
   providing a product conveyor configured to move the product instances through the production process;
   positioning a plurality of cameras at different locations along the product conveyor, wherein each camera of the plurality of cameras has an associated field of view;
   for each camera of the plurality of cameras, determining a difference in location along an axis parallel to a direction of travel of the product conveyor of a field of view of the each camera relative to a field of view of view of another of the plurality of cameras;

for each camera of the plurality of cameras, capturing images of product instances as the product instances pass through the camera's field of view on the conveyor;

associating each of a plurality of images captured by different ones of the cameras as being images of a same product instance;

based on one or more of the plurality of images of the same product instance, making a determination to reject the same product instance;

determining that the same product instance has reached a rejection location along the product conveyor; and taking action to reject the same product instance at the rejection location.

2. The method of claim 1, further comprising:

monitoring a travel position of the product conveyor over time; and for each of the plurality of images, determining a travel position of the conveyor at a time of capture.

3. The method of claim 2, wherein the associating each of a plurality of images captured by different ones of the cameras as being images of a same product instance is based on, for each image of the plurality of images:

the difference in location along an axis parallel to a direction of travel of the product conveyor of a field of view of the each camera capturing the each image relative to a field of view of view of another of the plurality of cameras, and the travel position of the conveyor at a time of capture.

4. The method of claim 3, wherein travel position is indicated using an incremental encoder.

5. The method of claim 4, further comprising:

in response to determining that the incremental encoder has experienced a rollover, temporarily adjusting travel positions for affected images captured after the rollover.

6. The method of claim 1, wherein the product conveyor has a circulating product carriage means marked with scannable indicia of travel position.

7. The method of claim 6, wherein the product carriage means is a belt and wherein the scannable indicia are machine-readable codes.

8. The method of claim 7, wherein the machine-readable codes are barcodes.

9. The method of claim 6, wherein the scannable indicia are printed numbers.

10. The method of claim 6, wherein the images of product instances captured as the product instances pass through the camera's field of view on the conveyor comprise the scannable indicia, and wherein the associating each of a plurality of images captured by different ones of the cameras as being images of a same product instance is based on matching of the scannable indicia.

11. A system for performing inspections of product instances during a production process, the system comprising:

a product conveyor configured to move the product instances through the production process;

a plurality of cameras positioned at different locations along the product conveyor, wherein each camera of the plurality of cameras has an associated field of view;

control logic configured to perform a method comprising:

for each camera of the plurality of cameras, storing a difference in location along an axis parallel to a direction of travel of the product conveyor of a field of view of the each camera relative to a field of view of view of another of the plurality of cameras;

for each camera of the plurality of cameras, capturing images of product instances as the product instances pass through the camera's field of view on the conveyor;

associating each of a plurality of images captured by different ones of the cameras as being images of a same product instance;

based on one or more of the plurality of images of the same product instance, making a determination to reject the same product instance;

determining that the same product instance has reached a rejection location along the product conveyor; and taking action to reject the same product instance at the rejection location.

12. The system of claim 11, wherein the method further comprises:

monitoring a travel position of the product conveyor over time; and for each of the plurality of images, determining a travel position of the conveyor at a time of capture.

13. The system of claim 12, wherein the associating each of a plurality of images captured by different ones of the cameras as being images of a same product instance is based on, for each image of the plurality of images:

the difference in location along an axis parallel to a direction of travel of the product conveyor of a field of view of the each camera capturing the each image relative to a field of view of view of another of the plurality of cameras, and the travel position of the conveyor at a time of capture.

14. The system of claim 13, wherein travel position is indicated using an incremental encoder.

15. The system of claim 14, wherein the method further comprises:

in response to determining that the incremental encoder has experienced a rollover, temporarily adjusting travel positions for affected images captured after the rollover.

16. The system of claim 11, wherein the product conveyor has a circulating product carriage means marked with scannable indicia of travel position.

17. The system of claim 16, wherein the product carriage means is a belt and wherein the scannable indicia are machine-readable codes.

18. The system of claim 17, wherein the machine-readable codes are barcodes.

19. The system of claim 16, wherein the scannable indicia are printed numbers.

20. The system of claim 16, wherein the images of product instances captured as the product instances pass through the camera's field of view on the conveyor comprise the scannable indicia, and wherein the associating each of a plurality of images captured by different ones of the cameras as being images of a same product instance is based on matching of the scannable indicia.

* * * * *

UNITED STATES PATENT AND TRADEMARK OFFICE
CERTIFICATE OF CORRECTION

| | |
|---|---|
| PATENT NO. | : 12,260,546 B2 |
| APPLICATION NO. | : 18/189196 |
| DATED | : March 25, 2025 |
| INVENTOR(S) | : Adam Mackenzie et al. |

Page 1 of 1

It is certified that error appears in the above-identified patent and that said Letters Patent is hereby corrected as shown below:

In the Specification

In Column 1, Lines 51-52, delete "view of view of" and insert -- view of --.

In Column 1, Line 63, delete "view of view of" and insert -- view of --.

In the Claims

In Column 6, Lines 66-67, in Claim 1, delete "view of view of" and insert -- view of --.

In Column 7, Line 27, in Claim 3, delete "view of view of" and insert -- view of --.

In Column 8, Lines 4-5, in Claim 11, delete "view of view of" and insert -- view of --.

In Column 8, Line 34, in Claim 13, delete "view of view of" and insert -- view of --.

Signed and Sealed this
Twenty-first Day of October, 2025

John A. Squires
*Director of the United States Patent and Trademark Office*